UNITED STATES PATENT OFFICE.

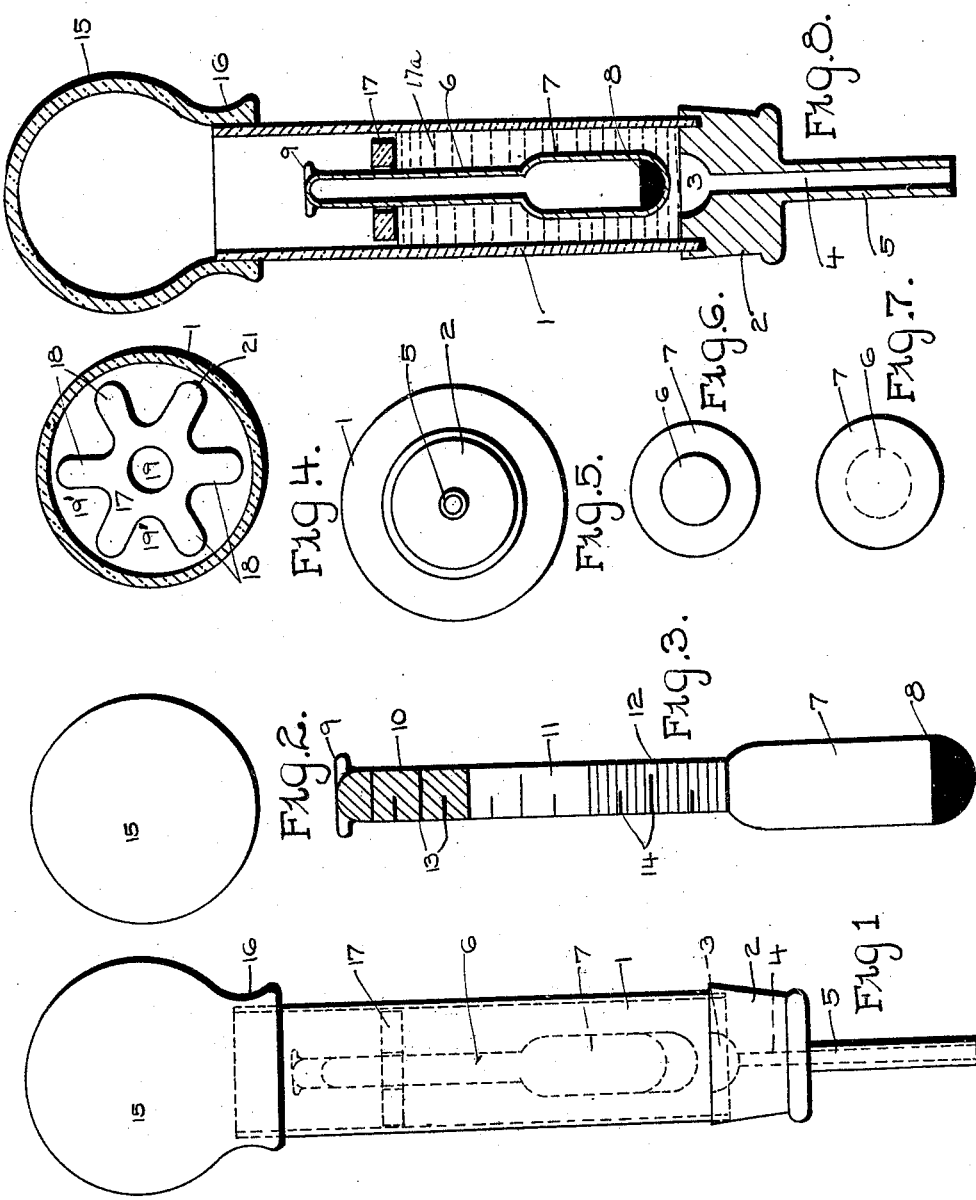

LOUIS P. LAROSE, OF WORCESTER, MASSACHUSETTS.

HYDROMETER.

1,410,929. Specification of Letters Patent. Patented Mar. 28, 1922.

Application filed September 23, 1920. Serial No. 412,259.

*To all whom it may concern:*

Be it known that I, LOUIS P. LAROSE, a citizen of the United States of America, residing at the city of Worcester, in the county of Worcester and State of Massachusetts, have invented new and useful Improvements in Hydrometers, of which the following is a specification.

My invention relates to improvements in hydrometers and has for its object to provide a simple, inexpensive and highly efficient device of the character described designed to facilitate obtaining an accurate reading of the hydrometer.

Another object of my invention is to provide a hydrometer in which the float will respond to a more accurate reading regardless of the angular position of the instrument in the hand of the user.

A still further object of my invention is to provide a hydrometer that will contribute a novel feature in the nature of a float freely guided for longitudinal movement in a container having sulphuric acid, the arrangement of the various parts being such that the float will be held against wobbling.

And it is still another object of my invention to divide the hydrometer float into various sections, each section being differently colored, the several colors being designed to designate the discharge, nearly or half full and fully charged condition of the instrument, these colors further serving to quickly visualize the indications of the float in the container.

A further object of my invention is to provide an attachment or adjunct to any hydrometer which will steady the working of the float to the extent that any deviation or irregular movement undergone by this float will be so controlled automatically that there will be no impediments against obtaining a free and accurate normal reading of the float.

With the above and other objects in view my invention consists in the arrangement, combination, and details of construction disclosed in the drawings and specification, and then more particularly pointed out in the appended claims.

In the drawings wherein similar reference characters designate similar parts throughout the respective views.

Figure 1 is a side elevation of my invention,

Figure 2 is a top plan thereof,

Figure 3 is a side elevation of a float,

Figure 4 is a cross section through my invention,

Figure 5 is a bottom plan of my invention,

Figure 6 is a top plan view of the float,

Figure 7 is a bottom plan view of the float, and

Figure 8 is a vertical sectional elevation of my invention.

In the drawings which are merely illustrative of my invention 1 designates the acid containing tank 1 which is tubular and made light and transparent. Secured to the lower end of this tubular tank 1 is a spout bearing 2 formed internally with a cup-shaped funnel 3 which communicates with the downwardly extending spout 5 the passage 4 in the spout adapted to suck in acid as will be described later. A long, slender tubular float 6 relatively light in weight and transparent is formed at its lower end with an enlargement 7 to the bottom of which is secured a weighted position 8 by virtue of which the float 6 is held immersed at all times within the sulphuric acid 17 which fills the tank 1. The upper end of the float 6 is formed with terminal wings or lugs 9.

The float is divided into a number of sections 10, 11, and 12, which are variably colored. For example the upper section of this float is colored red as indicated at 10, the section 11 there below is colored white while the section below this last section is colored blue, etc. All the sections viewed on the whole are calibrated as at 13 and 14 preferably consecutively. The calibrations in section 10 denote by their inscriptions as well as by their color the fact that the battery in which the hydrometer projects is discharged, the section 11 of the hydrometer brings out the fact that the battery is half full, while the lowest section 12 denotes that the battery is fully charged. If desired these colored effects and denotations may appear on any other part of the instrument so as to serve as a ready aid to the memory.

The deflatable hydrometer handle is in the form of a deflatable handle or bulb 15 having the part 16 shrunk upon the tubular tank 1. 17 designates the adjunct which constitutes my invention. It is in the nature of a partition plate made of acid impervious material and is formed upon its periphery with a circumferentially extending series of radially extending lugs or arms 18 by means of which this plate is suitably corrugated, a circumferential series of recesses 19' being formed between these lugs or arms. It will be seen that this partition plate 17 fits the tank 1 snugly but allows just enough clearance as at 21 to prevent a binding action between this plate 18 and the surrounding wall of the tubular tank 1.

In operation the user inserts the hydrometer into the battery to be tested and if any changes in specific gravity have taken place in the sulphuric acid $17^a$ contained in the tank 1 the result will be that the transparent, colored float 6 will rise or fall accordingly sliding within the opening 19 formed in the partition plate 17. When this takes place the plate 17 will remain stationary due to the fact that it rests upon the upper level of the sulphuric acid $17^a$ which level is maintained constant. The purpose of the terminal fingers or wings 9 is to prevent the vertical displacement of the float from this plate 17 when the float shall have risen its fullest distance. In order to get the sulphuric acid into the tank 1 from the battery the spout 5 is inserted in the battery and the bulb 15 is pressed, expelling some of the air and when it is released the acid $17^a$ is drawn up into the tank, the plate 17 rising with and on top of this acid. As soon as the acid is high enough for the float to move it takes a position to indicate specific gravity. When this takes place the bulb is further released with the spout in the air and then through the column of sulphuric acid bubbles must rise and make their escape above the corrugated plate 17. Some of the smaller as well as weaker bubbles tend to escape between the inner wall of the tank 1 and the adjacent periphery of the partition plate 17 but there is no other way for bubbles generated to pass from below this plate 17 and for this particular reason I have corrugated the plate 17 forming a circumferential series of recesses 19' to enable the rising bubbles to pass through these recesses.

It will thus be seen that I have improved a conventional hydrometer in the particulars wherein the same are now defective my invention conducing towards obtaining a more rapid accurate and easier reading of the float as concerns the latter's position in the tank and as concerns also visual appearance of the float.

Numerous modifications can be resorted to in practise without imparting in principle from the details of construction herein disclosed.

What I desire to protect and secure by Letters Patent is:—

1. A hydrometer consisting of solution chamber, a deflatable bulb at one end thereof, a spout at the other end thereof communicating with the chamber, a calibrated float in said chamber, and a plate fitting loosely in said chamber, having an opening to admit the float and formed upon its periphery with corrugations.

2. In a device as described in combination, a tank for holding a solution, a plate fitting said tank so as to be supported by said acid, and an elongated float slidably projecting through and guided by said plate, and provided with stops terminally so as to be held against displacement from said plate.

3. In a hydrometer a transparent chamber, a relatively light float in said chamber being weighted down at its lower end a cylindrical acid impervious partition plate fitting said chamber, having a hole at its center in which said float may slide and formed upon its outer circumference with a series of separated radical lugs providing recesses between them.

4. In a hydrometer, in combination, a transparent chamber containing a transparent float with upper terminal restraining lips said float being elongated, and means in said chamber and surrounding said float movably guiding the latter against wobbling.

5. In a hydrometer, in combination with a solution chamber and an elongated float therein, means loosely fitting said chamber and surrounding said float allowing said float to slide therein, said means having provision around its outer edge for allowing bubbles to pass therethrough.

6. In a device of the character described, a solution containing tank, a slender calibrated body therein floating in the solution its own density, and a collar surrounding the float and allowing the latter to slide therein, said collar being formed and shaped so as to provide bubble receiving pockets immediately confronting the inner wall of said container.

In witness he has hereunto set his hands and affixed his seal this 17th day of September, 1920.

LOUIS P. LAROSE. [L. S.]

Attested:
Wm. E. Baff,
Geo. F. Bousquet.